(12) United States Patent
Wang et al.

(10) Patent No.: US 9,718,013 B2
(45) Date of Patent: Aug. 1, 2017

(54) FORMATION AND IMMOBILIZATION OF SMALL PARTICLES BY USING POLYELECTROLYTE MULTILAYERS

(75) Inventors: Jinwen Wang, Milford, CT (US); Meedia A. Kareem, Bridgeport, CT (US); Rezan Kareem, Bridgeport, CT (US); Bruce Taylor, Cheshire, CT (US); Andrew W. Lombardo, West Haven, CT (US); Frank A. Brigano, Northford, CT (US)

(73) Assignee: KX Technologies LLC, West Haven, CT (US)

( * ) Notice: Subject to any disclaimer, the term of this patent is extended or adjusted under 35 U.S.C. 154(b) by 119 days.

(21) Appl. No.: 13/405,866

(22) Filed: Feb. 27, 2012

(65) Prior Publication Data

US 2013/0224378 A1  Aug. 29, 2013

(51) Int. Cl.
*B01D 39/18* (2006.01)

(52) U.S. Cl.
CPC ...... *B01D 39/18* (2013.01); *B01D 2239/0407* (2013.01); *B01D 2239/0442* (2013.01)

(58) Field of Classification Search
CPC .................. B01D 69/148; B01D 2239/0442
USPC ...................................................... 427/244
See application file for complete search history.

(56) References Cited

U.S. PATENT DOCUMENTS

| | | | |
|---|---|---|---|
| 3,000,739 A * | 9/1961 | Vere Maffet | 430/569 |
| 4,071,636 A * | 1/1978 | Nishino et al. | 427/244 |
| 4,933,081 A | 6/1990 | Sasaki et al. | |
| 6,835,311 B2 | 12/2004 | Koslow | |
| 6,866,704 B2 | 3/2005 | Koslow | |
| 6,953,604 B2 | 10/2005 | Koslow | |
| 6,959,820 B2 | 11/2005 | Koslow | |
| 6,998,058 B2 | 2/2006 | Koslow | |
| 7,008,537 B2 | 3/2006 | Koslow | |
| 7,011,753 B2 | 3/2006 | Koslow | |
| 7,067,294 B2 | 6/2006 | Singh et al. | |
| 7,122,106 B2 | 10/2006 | Lin et al. | |
| 7,144,533 B2 | 12/2006 | Koslow | |
| 7,357,868 B2 | 4/2008 | Levy | |
| 7,655,112 B2 | 2/2010 | Koslow | |
| 2004/0038007 A1 | 2/2004 | Kotov et al. | |
| 2007/0196401 A1 | 8/2007 | Naruse | |
| 2008/0026041 A1 | 1/2008 | Tepper et al. | |
| 2008/0264259 A1 | 10/2008 | Leung | |
| 2009/0090089 A1 | 4/2009 | Phelps et al. | |

(Continued)

FOREIGN PATENT DOCUMENTS

EP  1747723  1/2007

*Primary Examiner* — Alex A Rolland
(74) *Attorney, Agent, or Firm* — DeLio, Peterson & Curcio, LLC; Robert Curcio

(57) ABSTRACT

A method for forming and immobilizing small particles on a filter substrate using a first and second polymer solution, a solution of sodium bromide and a solution of a metal salt. The method adjusts the pH of at least one of the first and second polymer solutions, immersing the filter substrate in the first polymer solution and immersing the filter substrate in the second polymer solution. The method includes repeating the steps of immersing the filter substrate in the first solution and the second solution alternately until desired number of layers is achieved. The method allows for the filter substrate to be immersed in the solution of the metal salt and subsequently in the solution of sodium bromide.

15 Claims, 4 Drawing Sheets

(56) References Cited

U.S. PATENT DOCUMENTS

2009/0123652 A1\* 5/2009 Messersmith et al. ....... 427/352
2010/0050872 A1 3/2010 Lee
2011/0210062 A1\* 9/2011 Wang et al. .................. 210/496

\* cited by examiner

Merquat-100

Poly (acrylic acid) (PAA)

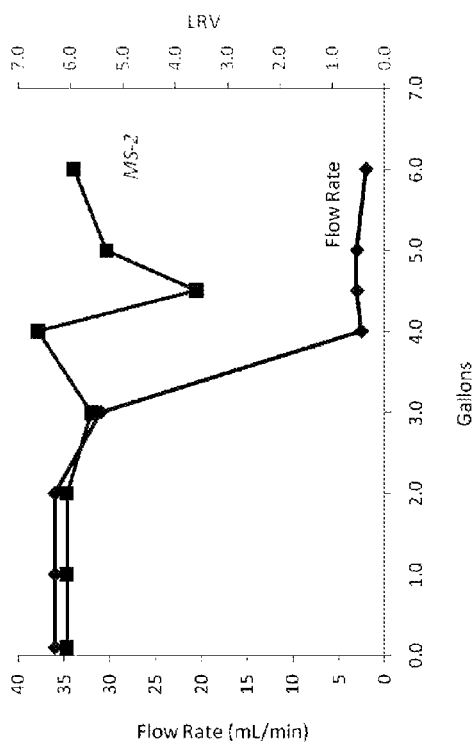
FIG. 6
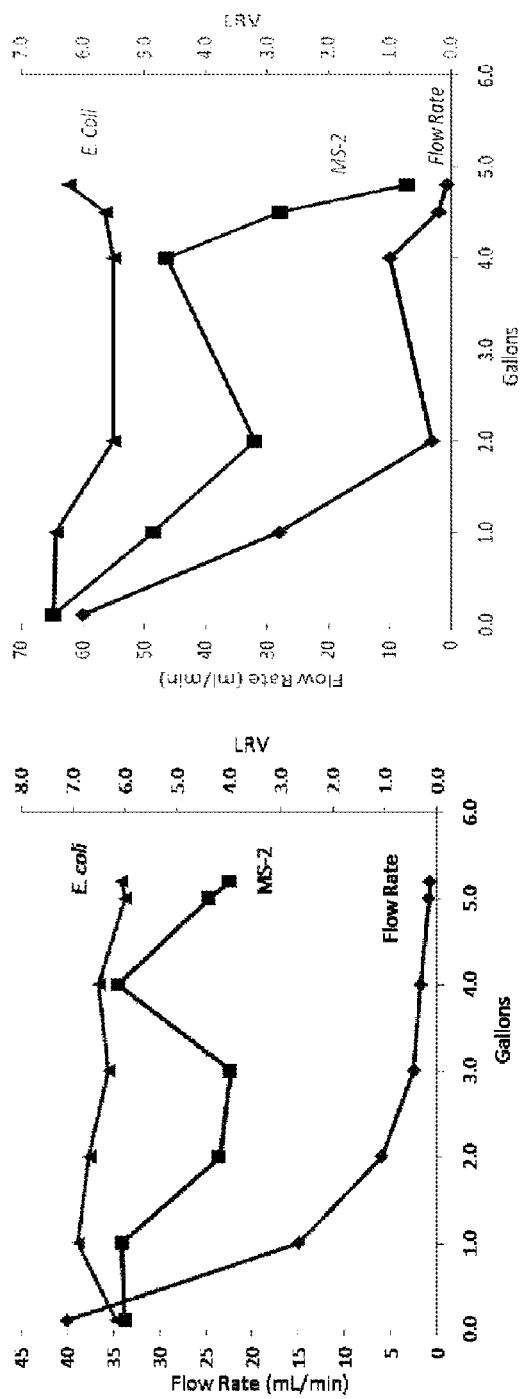
FIG. 8
FIG. 7

FORMATION AND IMMOBILIZATION OF SMALL PARTICLES BY USING POLYELECTROLYTE MULTILAYERS

BACKGROUND OF THE INVENTION

1. Field of the Invention

The present invention relates to a method of forming and immobilizing small particles on a filter substrate.

2. Description of Related Art

Small sized particles such as nanoparticles and particles below several micrometers are of great technological importance for water purification. Due to their small size and high surface area they have distinguishing properties, one of which includes being highly efficient. However, they are difficult to handle and recover in practice. It is difficult to immobilize these small particles on a substrate for a water filter.

Metallic silver nanoparticles may be synthesized within polyelectrolyte multilayers (PEM) on polystyrene tissue-culture substrates and quartz wafers in optical applications. PEMs are initially formed on the substrates and then the silver ions are diffused into the PEMs and reduced to silver metal nanoparticles. These nanoparticles are imbedded in the PEMs where they are immobilized.

Polyelectrolytes are polymers whose repeating units bear an electrolyte group. A repeating unit is the simplest structural entity of a polymer chain and defines polymer structure. A polymer consists of several repeat units linked together successively along the chain, in a similar manner to the beads of a necklace. A repeat unit, however, is not to be confused with a monomer, which refers to the small molecule from which a polymer is synthesized.

One of the simplest repeat units is that of polyethylene:

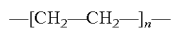

Polypropylene has the repeat unit:

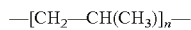

The subscript "n" denotes the degree of polymerization or the number of units linked together. The molecular mass of the repeat unit, MR, is simply the sum of the atomic masses of the atoms within the repeat unit. The molecular mass of the chain is just the product nMR.

These groups will dissociate in aqueous solutions (water), making the polymers charged. Polyelectrolyte properties are thus similar to both electrolytes (salts) and polymers (high molecular weight compounds), and are sometimes called polysalts. Like salts, their solutions are electrically conductive. Like polymers, their solutions are often viscous. Charged molecular chains, commonly present in soft matter systems, play a fundamental role in determining structure, stability, and the interactions of various molecular assemblies. Theoretical approaches to describing their statistical properties differ profoundly from those of their electrically neutral counterparts, while their unique properties are being exploited in a wide range of technological and industrial fields. One of their major roles, however, seems to be the one played in biology and biochemistry. Many biological molecules are polyelectrolytes. For instance, polypeptides (thus all proteins) and DNA are polyelectrolytes. Both natural and synthetic polyelectrolytes are used in a variety of industries.

Polyelectrolytes have several utility applications mostly related to modifying flow and stability properties of aqueous solutions and gels. For instance, they can be used to either stabilize colloidal suspensions, or to initiate flocculation (precipitation). They can also be used to impart a surface charge to neutral particles, enabling them to be dispersed in aqueous solution. They are thus often used as thickeners, emulsifiers, conditioners, flocculants, and even drag reducers. They are used in water treatment and for oil recovery. Many soaps, shampoos, and cosmetics incorporate polyelectrolytes. Furthermore they are added to many foods and to concrete mixtures (super plasticizer). Some of the polyelectrolytes that appear on food labels are pectin, carrageenan, alginates, polyvinylpyrrolidone and carboxymethyl cellulose. All but the last two are of natural origin.

Polyelectrolytes which are water-soluble have biochemical and medical applications such as using biocompatible polyelectrolytes for implant coatings and for controlling drug release.

Acids are classified as either weak or strong (and bases similarly may be either weak or strong). Similarly, polyelectrolytes can be divided into 'weak' and 'strong' types. A 'strong' polyelectrolyte is one which dissociates completely in solution for most reasonable pH values. A 'weak' polyelectrolyte, by contrast, has a dissociation constant (pKa or pKb) in the range of approximately 2 to approximately 10, meaning that it will be partially dissociated at intermediate pH. Thus, weak polyelectrolytes are not fully charged in solution, and moreover their fractional charge can be modified by changing the solution pH, counter ion concentration, or ionic strength.

The physical properties of polyelectrolyte solutions are usually strongly affected by this degree of charging. Since the polyelectrolyte dissociation releases counter-ions, this necessarily affects the solution's ionic strength, and in turn affects other properties, such as electrical conductivity.

When solutions of two oppositely charged polymers (that is, a solution of polycation and one of polyanion) are mixed, a bulk complex (precipitate) is usually formed. This occurs because the oppositely-charged polymers attract one another and irreversibly bind together.

Polyelectrolyte multilayers are thin films constructed using a layer-by-layer (LbL) deposition technique. During LbL deposition, a suitable growth substrate (usually charged) is dipped back and forth between dilute baths of positively and negatively charged polyelectrolyte solutions. During each dip a small amount of polyelectrolyte is adsorbed and the surface charge is reversed, allowing the gradual and controlled build-up of electrostatically cross-linked films of polycation-polyanion layers. Scientists have demonstrated thickness control of such films down to the single-nanometer scale. LbL films can also be constructed by substituting charged species such as nanoparticles or clay platelets in place of or in addition to one of the polyelectrolytes. LbL deposition has also been accomplished using hydrogen bonding instead of electrostatics.

Multilayer formation via layer-by-layer deposition of alternating charged polyelectrolytes requires a strong short-range attraction between the two types of polymer chains for the formation of multilayers. For strong enough short-range attraction, the adsorbed amount per layer increases (after an initial decrease), and finally stabilizes in the form of a polyelectrolyte multilayer that can be repeated hundreds of times. For weak short-range attraction between any two adjacent layers, the adsorbed amount (per added layer) decays as the distance from the surface increases, until the chains stop adsorbing altogether. The dependence of the threshold value of the short-range attraction as function of the polymer charge fraction and salt concentration is calculated.

The main benefits to PEM coatings are the ability to conformably coat objects (that is, the technique is not limited to coating flat objects), the environmental benefits of using water-based processes, reasonable costs, and the utilization of the particular chemical properties of the film for further modification, such as the synthesis of metal or semiconductor nanoparticles, or porosity phase transitions to create anti-reflective coatings, optical shutters, and super-hydrophobic coatings.

There is no standard method for immobilizing particles below several micrometers on substrates for antimicrobial applications for water purification. Some current methods may be implemented such as sintering, plasma, and electro-spraying where small particles are deposited on the substrate. However, these methods usually require extreme conditions such as a high temperature or high voltage.

SUMMARY OF THE INVENTION

Bearing in mind the problems and deficiencies of the prior art, it is therefore an object of the present invention to provide a method of forming and immobilizing small particles on a filter substrate using polyelectrolyte multilayers.

It is another object of the present invention to provide a method of forming and immobilizing small particles on a filter substrate by allowing particles to precipitate during the formation of polyelectrolyte layers.

A further object of the invention is to provide a method of forming and immobilizing small silver particles on a filter substrate by allowing silver particles to precipitate during the formation of polyelectrolyte layers.

It is yet another object of the present invention to provide a filter comprising particles precipitated during the formation of polyelectrolyte layers onto a substrate.

Still other objects and advantages of the invention will in part be obvious and will in part be apparent from the specification.

The above and other objects, which will be apparent to those skilled in the art, are achieved in the present invention which is directed to a method for forming and immobilizing small particles on a filter substrate comprising: providing a filter substrate; providing a first and second polymer solution; adjusting the pH of at least one of the first and second polymer solutions; immersing the filter substrate in the first polymer solution; immersing the filter substrate in the second polymer solution; repeating the steps of immersing the filter substrate in the first solution and the second solution alternately until desired number of layers is achieved; providing a solution of a metal salt; submerging the filter substrate in the solution of the metal salt; immersing the filter substrate in a solution of sodium bromide.

The step of immersing the filter substrate in the first polymer solution may be followed by rinsing the filter substrate in purified water. The step of immersing the filter substrate in the second polymer solution may be followed by rinsing the filter substrate in purified water.

The method may further comprise submerging the filter substrate in the first polymer solution after immersing the filter substrate in a solution of sodium bromide, and then drying the filter substrate.

The first or second polymer solution may include a homopolymer of diallyl dimethyl ammonium chloride. The first or second solution may include a poly acrylic acid. The metal salt may comprise a silver salt. The silver salt may include silver acetate.

The step of drying the filter substrate includes heating the substrate to a temperature of at least about 300° F.

The first polymer solution may be a cationic polyelectrolyte and the second polymer solution may be an anionic polyelectrolyte.

In a second aspect, the present invention is directed to a method for treating a filter substrate comprising: providing a filter substrate; immersing the filter substrate in a first solution including a polyelectrolyte and a metal salt; heating the filter substrate; immersing the filter substrate in a second solution including a poly acrylic acid, metal nitrate, and silver nitrate; heating the filter substrate; and repeating the steps of immersing and heating the filter substrate in the first and solutions alternately until desired number of layers is achieved.

The first polymer solution may be a cationic polyelectrolyte and the second polymer solution may be an anionic polyelectrolyte.

After the repeating steps of immersing and heating, the method may further include submerging the filter substrate in the first solution, and then submerging the filter substrate into a cationic polyelectrolyte.

The method includes rinsing the filter substrate in purified water and drying the filter substrate.

The second solution may include Zinc nitrate. The cationic polyelectrolyte may be a homopolymer of diallyl dimethyl ammonium chloride. The metal salt may be silver acetate.

In a third aspect, the present invention is directed to a method for forming and immobilizing small particles on a filter substrate comprising: providing a filter substrate; providing a first and second polymer solution; adjusting the pH of at least one of the first and second polymer solutions; immersing the filter substrate in the first polymer solution; rinsing the filter substrate in purified water; immersing the filter substrate in the second polymer solution; rinsing the filter substrate in purified water; repeating the steps of immersing the filter substrate in the first solution, rinsing the filter substrate, immersing the filter substrate in the second solution, and rinsing the filter substrate, until desired number of layers is achieved; providing a solution of a metal salt; immersing the filter substrate in the solution of the metal salt; rinsing the filter substrate in purified water; providing a solution of sodium bromide; immersing the filter substrate in the solution of sodium bromide; rinsing the filter substrate in purified water; submerging the filter substrate in a solution of homopolymer of diallyl dimethyl ammonium chloride; rinsing the filter substrate in purified water; and drying the filter substrate.

The filter substrate may include fibrillated cellulose nanofibers.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 6 is a chart showing MS-2 Removal with the pH of 3-4 using the treated paper of FIG. 5;

FIG. 7 is a chart showing the antimicrobial properties of paper filters PEM-2 treated via Procedure I;

FIG. 8 is a chart showing the antimicrobial properties of paper filters PEM-T2 treated via Procedure II;

DESCRIPTION OF THE PREFERRED EMBODIMENT(S)

Figure 1:
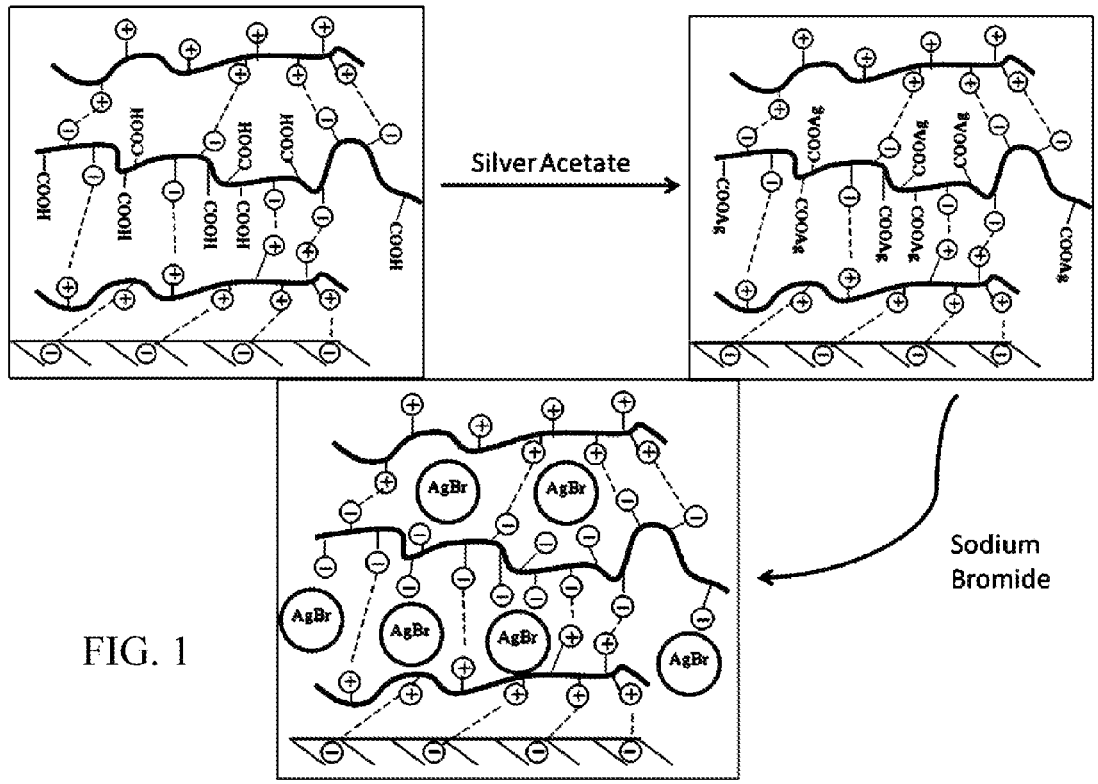
FIG. 1 is a schematic of silver bromide nanoparticles formed via layer-by-layer electrostatic self-assembly technique.
Figures 2, 3:
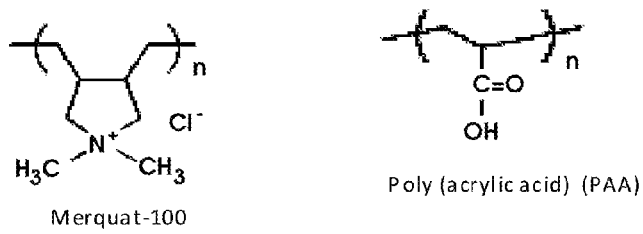
FIG. 2 is a schematic of the chemical structure of a Merquat® molecule.
FIG. 3 is a of the chemical structure of a Poly acrylic acid molecule.

In describing the preferred embodiment of the present invention, reference will be made herein to FIGS. 1-11 of the drawings in which like numerals refer to like features of the invention.

The method according to the present invention is for immobilizing nanoparticles of metal salts onto substrates for bacteria and viruses removal from water. The metal salt is a preferably a silver metal salt such as silver bromide, and the substrate is preferably fibrillated cellulose nanofibers. In the method, polyelectrolyte multilayers (PEMs) are deposited on substrates from oppositely charged materials via layer-by-layer electrostatic self-assembly at an ambient condition. The particles are synthesized inside PEMs. The charged material may be a cationic or anionic polymer. Through this procedure, the growth of particles is limited by the network of PEMs, which results in the formation of small sized particles. At the same time, the PEMs act as adhesives to anchor the small particles on substrates. On the other hand, the particles play a role of fillers to enhance the network. The filters thus prepared, especially in the form of gravity filters, can achieve at least 4 log reduction of MS-2 and 6 log reduction of E. coli. Such filters are expected to have a faster antimicrobial kinetics, which means they will allow for and accommodate a higher flow rate. In addition, the amount of biocides, such as polyelectrolytes and silver bromide, can be greatly reduced. The thickness of the cellulose filter paper can be very thin, on the order of approximately 0.5 mm. As it is known, the thinner the paper, the more pleated sheets of paper can be achieved in the filter design, which can increase the flow rate and capacity of the filter.

In the method for immobilizing small particles, a homopolymer of diallyl dimethyl ammonium chloride and a poly(acrylic acid) are deposited alternatively on cellulose nanofiber paper, forming polyelectrolyte multilayers. Adjusting the pH of the deposition solution, varies the number and density of the available unreacted functional groups. The paper is immersed in silver acetate whereby the unreacted carboxylic acidic groups react with the silver acetate to form carboxylic acidic silver within the PEM layers. The paper is the immersed into a sodium bromide solution wherein nanosized silver bromide particles are then formed.

The filter prepared by this method has been shown to function excellently for MS-2 removal even at a pH of about 3, at which the MS-2 is positively charged. Consequently, the filter can remove both negatively and positively charged viruses, while most other filters can only remove negatively charged viruses.

Additionally, the deposition time may be further shortened by forming and immobilizing small particles together with the formation of the PEMs rather than forming the PEMs and the nanoparticles separately. In this method, the PEMs co-precipitate simultaneously with the nanoparticles. For example, the cationic polyelectrolyte dissolved with silver salts such as silver acetate, silver nitrate, or silver sulfate together, while the anionic polyelectrolytes dissolve with sodium bromide together. The substrates are then immersed into the above two solutions alternatively to obtain PEMs doped with silver bromide nanoparticles. In this manner, the time-consuming steps for the diffusion and exchange of silver and bromide ions are avoided. Moreover, the number of polyelectrolyte bilayers is reduced.

Nanoparticles comprising alternate materials may be deposited on cellulose nanofibers including metal oxide/hydroxides of zinc, magnesium, copper, iron, and aluminum. Preferably metal oxides/hydroxides with high isoelectric points including Zinc (8.4-8.5), Magnesium (12), Copper (9.5), Aluminum (8-9), and Iron (8.4-8.5) may be precipitated. The high isoelectric point could result in a strong adsorption of the negatively charged microbes and allow for more open or thinner paper. The thinner paper can lead to more a greater pleated number, which results in more surface area per unit volume. Antimicrobial screening tests has shown that the combination of silver bromide and zinc oxide/hydroxide reduces the thickness of cellulose nanofiber paper from approximately 0.5 mm to approximately 0.3 mm, while the anti-microbial efficiency remains about the same.

The present method is capable of immobilizing small particles on substrates at an ambient condition. Advantageously, the process is simple and easy to scale up. When this method is used to immobilize silver bromide and/or metal oxides/hydroxides on fibrillated cellulose nanofibers to make filters for water purification, it greatly reduces the amount of raw materials, simplifies the process, and enhances the antimicrobial efficiency of the filters. Furthermore, this process may be extended to other kinds of small particles and substrates for various applications.

Importantly, for water filtration applications, most filters only remove negatively charged pathogens, while a filter prepared through the methodology of the present invention is capable of removing both positively and negatively charged pathogens.

Procedure I: Serial Formation and Immobilization of Small Particles

As shown in the FIG. 1, diallyl dimethyl ammonium chloride (DADMAC) and poly(acrylic acid) were deposited alternatively on a cellulose nanofiber paper. Merquat®-100 is the trade name of a homopolymer of diallyl dimethyl ammonium chloride, commercially available from Nalco Chemical Company of Naperville, Ill., and is a preferred DADMAC.

A PEM is formed using the methodology of the present invention. The number of unreacted functional groups, for example, carboxylic acid, is adjusted by controlling the pH of the deposition solution of Merquat-100 and poly (acrylic acid). These unreacted carboxylic acidic groups react with silver acetate to form carboxylic acidic silver inside the PEMs. Nanosized silver bromide particles are formed, due to the limitation of PEMs, by immersing the paper into sodium bromide solution. The antimicrobial property of gravity filters made from such paper demonstrably exceeds the performance of typical gravity filters made in the art. A small, thin-sized paper of 4 by 4 inches with a thickness on the order of 0.55 mm has been shown to treat a challenging solution up to 5 gallons with 6 log reduction of *E. Coli* and 4 log reduction of MS-2.

Furthermore, the effect of thickness of paper on the microbial reduction has been quantified under serial application. Three papers with respective thickness of approximately 0.55 mm (identified as PEM-2), 0.33 mm (identified as PEM-4), and 0.21 mm (identified as PEM-5) were coated by the method of the present invention. Only the filter from the paper with thickness of approximately 0.55 mm sufficiently succeeded in adequately filtering to the strict specifications of at least 6 log reduction of *E. Coli* and 4 log reduction of MS-2 before clogging. Test results are depicted in FIG. 4.

Figure 5:
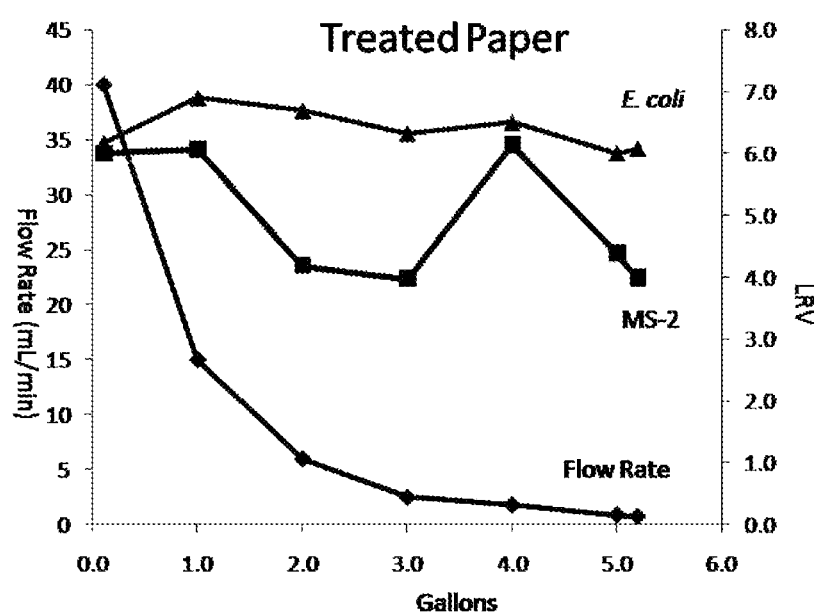
FIG. 5 is a chart showing the antimicrobial properties of treated paper.

In addition, paper filter prepared by the methodology of the present invention has an antivirus property at low pH since it contains negatively charged poly (acrylic acid). The result is shown in FIG. 5. At a pH lower than the isoelectric point of MS-2, which is 3.9, the virus is positively charged. After passing up to six gallons of a challenging solution with pH of about 3 to 4, the average virus reduction was still maintained at 6 log.

Figure 4:
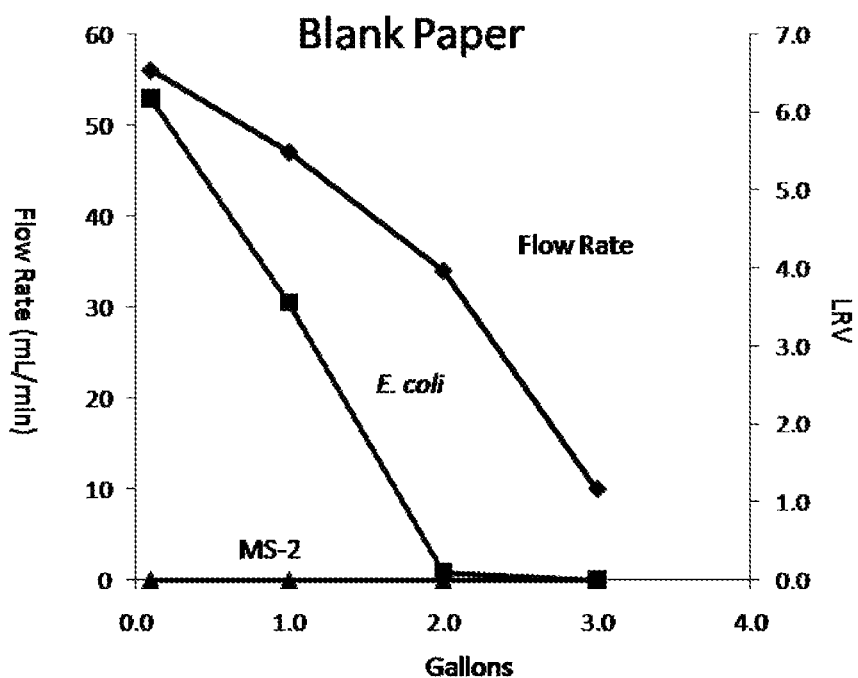
FIG. 4 is a chart showing the antimicrobial properties of untreated paper.

In FIGS. 4 and 5, the antimicrobial properties of blank paper and treated paper, respectively, such as PEM-2, is shown with blank paper having properties of thickness (0.60 mm), mean flow path (0.4128 μm), bubble point (3.4938 μm), and permeability (0.25 at 1 psi). Conversely, for treated paper, the values of these properties were: thickness (0.55 mm), mean flow path (0.3525 μm), bubble point (3.2145 μm), and permeability (0.28 at 1 psi). Silver leaching has been shown to be below EPA MCL (100 ppb) at about 10-30 ppb.

The detailed deposition process is described as follows: CSF 0 fibrillated cellulose nanofibers were prepared according to processes described in the prior art, such as the processes described in U.S. Pat. Nos. 7,144,533, 7,011,753, 7,008,537, 6,998,058, 6,959,820, 6,953,604, and 6,835,311. PET/PET (from Minifiber Company) was used as a binder. Blank paper was prepared from 80 wt % CSF 0 fibrillated cellulose nanofibers and 20 wt % PET/PET according to the aforementioned patented processes. The paper was heated at 300° F. for at least one hour in order to ensure complete binding which avoids the detrimental swelling in the deposition steps. The blank paper was then treated via the layer-by-layer electrostatic self-assembly technique of the present invention:

a) immersing the blank paper in Merquat®-100 solution for 10 mins. (The Merquat®-100 solution is 0.04 M, i.e., 16.2 grams 40% Merquat®-100 in 1000 mL DI water, with a pH=3.0 adjusted by 5% HCl.);

b) immersing the paper in DI water for about 1 minute approximately three times;

c) submerging the paper into poly(acrylic acid) (PAA) solution for about 10 minutes. (The PAA solution is 0.02 M, i.e., 4.12 grams 35% PAA in 1000 mL DI water, with a pH=3.0 adjusted by 5% HCl.);

d) immersing the paper in DI water for about 1 minute for approximately three times;

e) repeating steps (a)-(d) about 5 times;

f) submerging the paper in silver acetate solution overnight. (The solution is 5 mM, i.e., 0.85 grams in 1000 mL DI water.);

g) immersing the paper in DI water for 10 minutes, twice;

h) placing the paper in sodium bromide (10 mM, 1.03 grams in 1000 mL DI water) for approximately six hours;

i) immersing the paper in DI water for 10 minutes, twice;

j) submerging the paper in Merquat®-100 solution for 10 minutes;

k) immersing the paper in DI water for 10 minutes, twice; and l) drying the paper with blotted paper and heated at approximately 300° F. for one hour.

Samples of a 4"×4" squares were cut from a paper sheet subjected to the above-identified methodology (Procedure I), wrapped on a plastic cylindrical core of 4 inches in length, and glued properly. Cylindrical filters fabricated from this method were then glued onto openings of bottoms of 1-gallon capacity buckets. The filters were then challenged with a mixture of approximately $10^6$ cfu/mL of *E. coli* and $10^6$ cfu/mL of MS-2 *Bacteriophage* in one gallon of de-chlorinated city water. Gravity acted as the driving pressure. The flow rates and pH of influents and effluents were checked daily until the filters clogged. Samples from influent and effluent were collected and cultured daily. The detailed antimicrobial experiments (*E. Coli* and MS-2 reduction) of the gravity filter and are shown in the chart of FIG. 6.

Procedure II: Parallel Formation and Immobilization of Small Particles

The effect of thickness of paper on the microbial reduction has been studied using the methodology of the present invention under parallel application. Three papers with approximate thickness of 0.49 mm (PEM-T2), 0.33 mm (PEM-T4), and 0.24 mm (PEM-T5) were coated. The experimental results of successful antimicrobial reduction were demonstrated. By the methodology of the present invention, a thin small sized paper of about 4" by 4" with a thickness of about 0.49 mm has been shown to treat a challenging solution up to 4 gallons with 6 log reduction of *E. Coli* and 4 log reduction of MS-2. The properties of treated paper prepared by both Procedure I and Procedure II are shown in FIGS. 7 and 8, respectively. Before 4 gallons, both paper filters have very close properties. For PEM-T4 and PEM-T5, only 4 and 2 log reduction of *E. Coli* was demonstrated. There was no noticeable no MS-2 reduction.

The same blank paper was used. Silver bromide coated paper with three different thicknesses was prepared according to the process of Procedure II identified below. The paper properties are listed in Table 1.

TABLE 1

| Properties of paper prepared via Procedure II | | | |
|---|---|---|---|
| | PEM-T2 | PEM-T4 | PEM-T5 |
| Thickness (mm) | 0.49 | 0.33 | 0.24 |
| Weight per 12 inch × 12 inch (grams) | 15.0 | 8.0 | 4.0 |
| Mean flow pore diameter (μm) | 0.2986 | 0.3642 | 0.4945 |
| Bubble point pore diameter (μm) | 3.2248 | 3.5061 | 4.4272 |
| Permeability at 1 PSI | 0.29 | 0.59 | 1.22 |

The methodology according to Procedure II was performed on the paper in the following manner:

a) immersing blank paper in Merquat®-100/NaBr solution for 10 minutes. (The solution contains 5 mM Merquat®-100, i.e., 2.03 g 40% Merquat®-100 in 1000 mL DI water, and 15 mM NaBr, i.e., 1.55 g. pH=3.90.);

b) heating the paper at 200° F. for 3-5 minutes;

c) submerging the paper in poly(acrylic acid) (PAA)/silver nitrate solution for 10 minutes. (The solution contains 5 mM, i.e., 1.03 g 35% PAA in 1000 mL DI water, and 10 mM silver nitrate, i.e., 1.7 g. pH=2.50, adjusted by HNO3 (5%).);

d) heating the paper at 200° F. for 3-5 minutes;

e) repeating steps (a) to step (d) one more time;

f) submerging the paper in the above Merquat®-100/NaBr solution for 10 minutes, and then into 40 mM Merquat®-100 for 10 minutes;

g) immersing the paper in DI water for 10 minutes, twice; and h) drying the paper with blotted paper and heated at 300° F. for one hour.

The charts in FIGS. 7 and 8 depict the antimicrobial properties of paper filters PEM-T2 treated via the Procedure I (FIG. 7) and PEM-T2 treated via the Procedure II (FIG. 8).

Formation and Immobilization of Metal Oxides/Hydroxides with Silver Bromide

In order to prepare filters with thinner paper, the effect of different metal oxides/hydroxides on the microbial reduction was considered. The high isoelectric point resulted in a strong adsorption of the negatively charged microbes and allowed more open paper, i.e., thinner paper. Papers with approximate thickness on the order of 0.34 mm were prepared. Properties of samples of this paper are listed in Table 2 below.

TABLE 2

Properties of paper treated by different methods

|  | PEM-T2 | PEM-T4 | PEM-T4-Ag—Zn |
|---|---|---|---|
| Thickness (mm) | 0.49 | 0.33 | 0.34 |
| Weight per 12 inch × 12 inch (grams) | 15.0 | 8.0 | 8.0 |
| Mean flow pore diameter (μm) | 0.2986 | 0.3642 | 0.4697 |
| Bubble point pore diameter (μm) | 3.2248 | 3.5061 | 2.077 |
| Permeability at 1 PSI | 0.29 | 0.59 | 0.61 |

Figure 9:
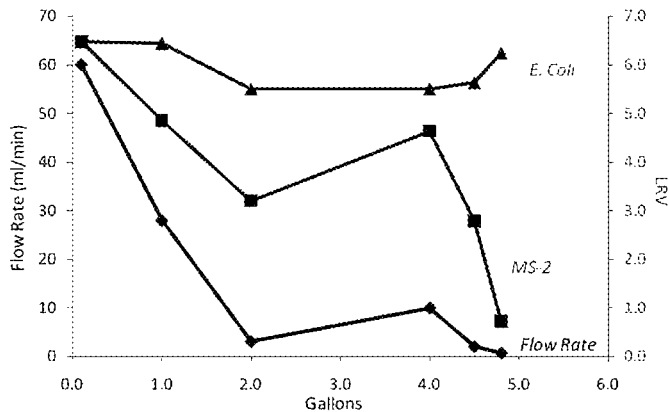
FIG. 9 is a chart showing the antimicrobial properties of paper filters of PEM-T2.
Figure 10:
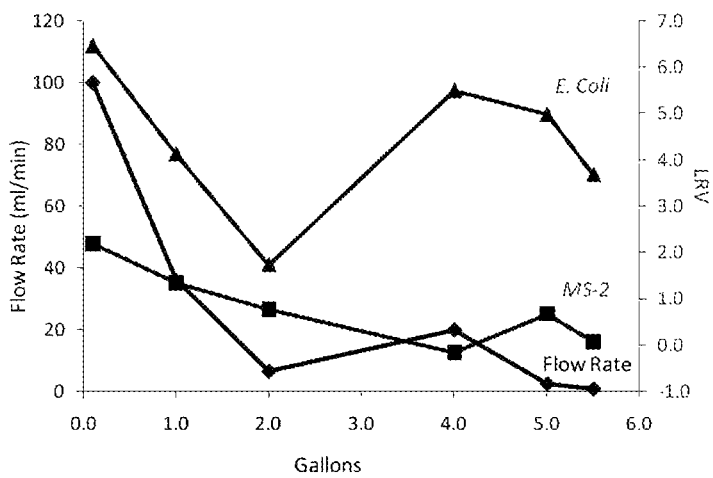
FIG. 10 is a chart showing the antimicrobial properties of paper filters of PEM-T4.
Figure 11:
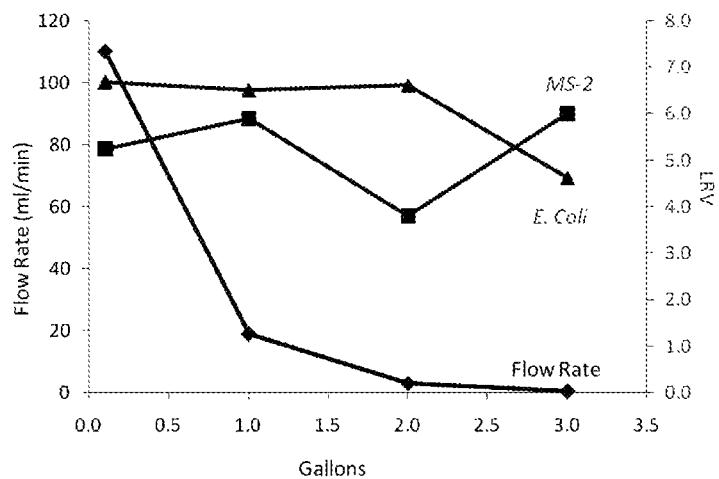
FIG. 11 is a chart showing the antimicrobial properties of paper filters of PEM-T4-Ag—Zn.

As a comparison, paper with a thickness of 0.49 mm (PEM-T2) and the paper with a thickness of 0.33 mm (PEM-T4), both of which only contained silver bromide and no other metal oxides/hydroxides, are also listed. The antimicrobial properties of the three paper filters, respectively, are shown in FIG. 9-11. The experimental results of antimicrobial performance for the paper PEM-T4-Ag—Zn exceed the other two trial samples. A small, thin sized paper, approximately 4" by 4" with a thickness of about 0.34 mm, can result in 6 log reduction of *E. Coli* and 4 log reduction of MS-2. This result is comparative to the property of PEM-T2. Especially, at the flow rate of 110 ml/min, the thin paper filter from PEM-T4-Ag—Zn performed better. For PEM-T4, only 4 log reduction of *E. Coli*, and practically no MS-2 reduction was observed.

In an alternative embodiment, small particle coated papers with two different thicknesses of about 0.50 mm and 0.30 mm were prepared according to the following process:

a) immersing blank paper in Merquat®-100/NaOH/NaBr solution for 10 minutes. (The solution contains 5 mM Merquat®-100, i.e., 2.03 g 40% Merquat®-100 in 1000 mL DI water, 10 mM NaOH, i.e., 0.4 g, and 10 mM NaBr, i.e., 1.04 g. The same blank paper as in the Procedure I and II was used.);

b) heating the paper at 200° F. for 5 minutes;

c) submerging the paper into poly (acrylic acid) (PAA)/Zinc nitrate/silver nitrate solution for 10 minutes. (The solution contains 5 mM, i.e., 1.03 g 35% PAA in 1000 mL DI water, 6 mM metal nitrate, and 10 mM silver nitrate, i.e., 1.7 g.);

d) heating the paper at 200° F. for 5 minutes;

e) repeating steps (a) to step (d) one more time;

f) submerging the paper in the above Merquat®-100/NaOHNaBr solution for 10 minutes, and then into 40 mM Merquat®-100 for 10 minutes;

g) immersing the paper in DI water for 1 minute three times; and h) drying the paper with blotted paper and heated at 200° F. for one hour.

FIGS. 9-11 respectively show the antimicrobial properties of paper filters of PEM-T2, PEM-T4 and PEM-T4-Ag—Zn.

Thus, the present invention provides a methodology of forming and immobilizing small particles on a filter substrate using polyelectrolyte multilayers.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for forming and immobilizing small particles on filter paper for treating water passing therethrough, said method comprising:
   providing a porous filter paper of fibrillated cellulose nanofibers having a surface, at least a portion of said surface including antimicrobial properties; and
   treating said filter paper by:
     providing a first and second polymer solution of opposite polarity;
     adjusting the pH of at least one of the first and second polymer solutions;
     immersing the filter paper in the first polymer solution;
     immersing the filter paper in the second polymer solution;
     repeating the steps of immersing the filter paper in the first solution and the second solution alternately until the desired number of layers of alternating polarity, and not less than three layers, are formed;
     providing a solution of a metal salt;
     submerging the filter paper in the solution of the metal salt;
     immersing the filter paper in a solution of sodium bromide; and
     forming a filter media for treating water using said filter paper.

2. The method of claim 1 wherein the step of immersing the filter paper in the first polymer solution is followed by rinsing the filter paper in purified water.

3. The method of claim 1 wherein the step of immersing the filter paper in the second polymer solution is followed by rinsing the filter paper in purified water.

4. The method of claim 1 wherein each step of immersing the filter paper in polymer solution is followed by rinsing in purified water.

5. The method of claim 1 including submerging the filter paper in said first polymer solution after immersing the filter paper in a solution of sodium bromide, and then drying the filter paper.

6. The method of claim 5 wherein the step of drying the filter paper includes heating the paper to a temperature of at least about 300° F.

7. The method of claim 1 wherein the first or second polymer solution is a homopolymer of diallyl dimethyl ammonium chloride.

8. The method of claim 1 wherein the first or second solution is a poly acrylic acid.

9. The method of claim 1 wherein the metal salt comprises a silver salt.

10. The method of claim 9 wherein the silver salt comprises silver acetate.

11. The method of claim 1 wherein the filter paper has a thickness of approximately 0.3 mm.

12. A method for forming and immobilizing small particles on a filter paper for treating water passing therethrough, said method comprising:
 providing a porous filter paper having a surface, at least a portion of said surface including antimicrobial properties; and
 treating said filter paper by sequentially:
  providing an alternating first and second polymer solution of opposite polarity;
  adjusting the pH of at least one of the first and second polymer solutions;
  immersing the filter paper in the first polymer solution;
  rinsing the filter paper in purified water;
  immersing the filter paper in the second polymer solution;
  rinsing the filter paper in purified water;
  repeating the steps of immersing the filter paper in the first solution, rinsing said filter paper, immersing the filter paper in the second solution, and rinsing said filter paper, until desired number of layers and not less than three layers are formed;
  providing a solution of a metal salt;
  immersing the filter paper in the solution of the metal salt;
  rinsing the filter paper in purified water;
  providing a solution of sodium bromide;
  immersing the filter paper in the solution of sodium bromide;
  rinsing the filter paper in purified water;
  submerging said filter paper in a solution of homopolymer of diallyl dimethyl ammonium chloride;
  rinsing the filter paper in purified water;
  drying said filter paper; and
  forming a filter media for treating water using said filter paper.

13. The method of claim 12 wherein the filter paper is a fibrillated cellulose nanofibers.

14. The method of claim 12 wherein the step of drying includes heating said filter paper at a temperature of approximately 300° F.

15. The method of claim 12 wherein the filter paper has a thickness of approximately 0.3 mm.

* * * * *

UNITED STATES PATENT AND TRADEMARK OFFICE
CERTIFICATE OF CORRECTION

PATENT NO. : 9,718,013 B2
APPLICATION NO. : 13/405866
DATED : August 1, 2017
INVENTOR(S) : Wang et al.

Page 1 of 1

It is certified that error appears in the above-identified patent and that said Letters Patent is hereby corrected as shown below:

In the Specification

In Column 4, Line 12, after "and" insert -- second --

In Column 4, Line 66, after "..is a" insert -- schematic --

Signed and Sealed this
Sixth Day of February, 2018

Joseph Matal
*Performing the Functions and Duties of the*
*Under Secretary of Commerce for Intellectual Property and*
*Director of the United States Patent and Trademark Office*